(12) United States Patent
Cloke

(10) Patent No.: US 6,977,789 B1
(45) Date of Patent: Dec. 20, 2005

(54) DISK DRIVE FOR CIRCULAR SELF SERVO WRITING AND SPIRAL SELF SERVO WRITING USING PREWRITTEN REFERENCE SERVO BURSTS

(75) Inventor: Robert L. Cloke, Santa Clara, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 269 days.

(21) Appl. No.: 10/066,208

(22) Filed: Jan. 31, 2002

(51) Int. Cl.$^7$ .............................................. G11B 21/02
(52) U.S. Cl. .......................................... 360/75; 360/17
(58) Field of Search ..................... 360/75, 17

(56) References Cited

U.S. PATENT DOCUMENTS

| | | |
|---|---|---|
| 4,531,167 A | 7/1985 | Berger |
| 4,636,885 A | 1/1987 | Yamada et al. |
| 4,812,929 A | 3/1989 | Stewart et al. |
| 5,553,086 A | 9/1996 | Sompel et al. |
| 5,583,712 A | 12/1996 | Brunelle |
| 5,619,387 A | 4/1997 | Ottesen et al. |
| 5,668,679 A | 9/1997 | Swearingen et al. |
| 5,793,559 A | 8/1998 | Shepherd et al. |
| 6,023,145 A | 2/2000 | Karaaslan et al. |
| 6,061,200 A | 5/2000 | Shepherd et al. |
| 6,091,564 A * | 7/2000 | Codilian et al. .............. 360/75 |
| 6,292,318 B1 | 9/2001 | Hayashi |
| 6,304,407 B1 | 10/2001 | Baker et al. |
| 6,429,995 B1 | 8/2002 | Dobbek et al. |
| 6,469,859 B1 | 10/2002 | Chainer et al. |
| 6,476,989 B1 | 11/2002 | Chainer et al. |
| 6,507,450 B1 | 1/2003 | Elliott |
| 6,519,107 B1 | 2/2003 | Ehrlich et al. |
| 6,704,156 B1 * | 3/2004 | Baker et al. .................. 360/75 |
| 6,738,205 B1 * | 5/2004 | Moran et al. ................ 360/17 |

* cited by examiner

*Primary Examiner*—David Hudspeth
*Assistant Examiner*—Mitchell R Slavitt
(74) *Attorney, Agent, or Firm*—Howard H. Sheerin, Esq.

(57) ABSTRACT

A disk drive is disclosed comprising a disk and a head actuated radially over the disk. An external servo writer is used to write reference servo bursts to the disk at a coarser radial resolution than product servo bursts. During a self servo writing operation, the reference servo bursts are processed to servo circularly to write a first set of product servo bursts to the disk. The reference servo bursts are also processed to servo spirally to write a second set of product servo bursts to the disk.

20 Claims, 6 Drawing Sheets

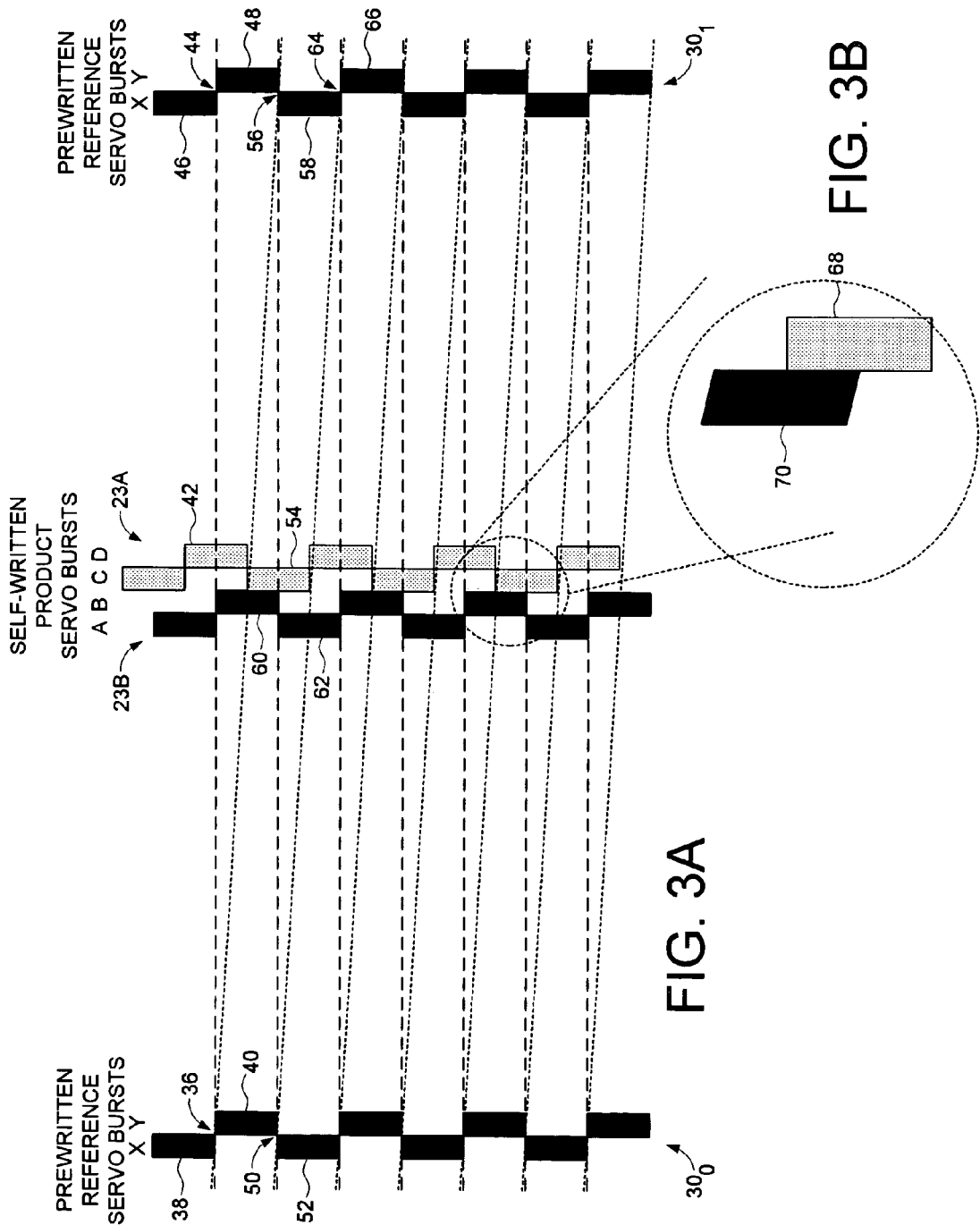

DISK DRIVE FOR CIRCULAR SELF SERVO WRITING AND SPIRAL SELF SERVO WRITING USING PREWRITTEN REFERENCE SERVO BURSTS

BACKGROUND OF THE INVENTION

1. Field of the Invention

The present invention relates to disk drives. More particularly, the present invention relates to a disk drive for circular self servo writing and spiral self servo writing using prewritten reference servo bursts.

2. Description of the Prior Art

Disk drives are servo written with embedded servo sectors to enable accurate positioning of the head with respect to the data tracks. The embedded servo sectors comprise coarse positioning information (e.g., a data track number) together with fine positioning information for tracking the centerline of the data track while writing data to the disk and reading data from the disk. The fine positioning information comprises servo bursts located at precise intervals and offsets with respect to a data track's centerline.

FIG. 1 which shows a disk 2 comprising a number of concentric data tracks 4 having a number of embedded servo sectors 6 which form a servo wedge from the outer diameter track to the inner diameter track. Each servo sector 6 comprises a preamble 8, a sync mark 10, servo data 12, and servo bursts 14. The preamble 8 comprises a periodic pattern which allows proper gain adjustment and timing synchronization of the read signal, and the sync mark 10 comprises a special pattern for symbol synchronizing to the servo data 12. The servo data 12 comprises identification information, such as sector identification data and a track address. The servo control system reads the track address during seeks to derive a coarse position for the head with respect to the target data track. The track addresses are recorded using a phase coherent Gray code so that the track addresses can be accurately detected when the head is flying between data tracks. The servo bursts 14 in the servo sectors 6 comprise groups of consecutive transitions (e.g., A, B, C and D bursts) which are recorded at precise intervals and offsets with respect to the data track's centerline. Fine head position control information is derived from the servo bursts 14 for use in centerline tracking while writing data to and reading data from the target data track.

Conventional disk drives are servo written using servo writer machines which processes the disk drives in assembly line fashion during manufacturing. The servo writers employ very precise head positioning mechanics, such as a laser interferometer, for positioning the head at precise radial locations with respect to previously servo-written tracks so as to achieve very high track densities. In addition, the head disk assembly (HDA) within the disk drive is typically exposed to the environment through apertures which allow access to the disk drive's actuator arm and the insertion of a clock head. This requires the servo writing process to take place in a "clean room" free of contaminant particles. Further, the manufacturing throughput is limited by the number of servo writers available, and the cost of each servo writer and clean room becomes very expensive to duplicate.

It is known to "self servo write" a disk drive using the internal components of the drive so as to obviate the need for external servo writers, thereby decreasing the manufacturing cost and increasing manufacturing throughput. Many of the self servo writing techniques suggest to propagate a write clock as well as the servo sectors from a previously servo-written track to a next servo-written track. However, these prior art techniques are susceptible to exponential error growth due to the multiplicative effects of propagating the write clock and servo sectors thousands of times.

There is, therefore, a need for an improved technique for servo writing a disk drive which reduces the bottleneck of external servo writers and ameliorates the exponential error growth inherent in the prior art self servo writing techniques.

SUMMARY OF THE INVENTION

The present invention may be regarded as a disk drive comprising a disk having a plurality of data tracks, each data track comprising a plurality of data sectors and embedded servo sectors, each embedded servo sector comprising a plurality of product servo bursts written at a radial resolution finer than the radial resolution of the data tracks. A head is attached to a distal end of an actuator arm, wherein the actuator arm is rotated to actuate the head radially over the disk to write data to and read data from the data sectors. During a self servo writing operation, a disk controller reads reference servo bursts from the disk, wherein the reference servo bursts are written to the disk using an external servo writer at a radial resolution coarser than the radial resolution of the product servo bursts. The disk controller processes the reference servo bursts to maintain the head in a substantially circular trajectory with respect to the disk to write a first set of the product servo bursts to the disk. The disk controller processes the reference servo bursts to maintain the head in a substantially spiral trajectory with respect to the disk to write a second set of the product servo bursts to the disk.

In one embodiment, the reference servo bursts are written to the disk at a radial resolution equal to half the radial resolution of the product servo bursts.

In one embodiment, a single product servo burst is written circumferentially to the disk between two reference servo bursts. In another embodiment, a plurality of product servo burst are written circumferentially to the disk between two reference servo bursts.

In one embodiment, the second set of product servo bursts are written to the disk at an oblique angle relative to the first set of product servo bursts.

In one embodiment, the disk controller writes the first set of product servo bursts to the disk over a single stroke of the actuator arm, and writes the second set of product servo bursts to the disk over multiple strokes of the actuator arm.

In one embodiment, the disk controller erases the reference servo bursts, and in another embodiment, the disk controller overwrites the reference servo bursts with user data.

The present invention may also be regarded as a method of servo writing a disk drive. The disk drive comprises a disk, an actuator arm, and a head attached to a distal end of the actuator arm. An external servo writer is used to write a plurality of reference servo bursts to the disk. The reference servo bursts are read from the disk and used to maintain the head in a substantially circular trajectory with respect to the disk to write a first set of product servo bursts to the disk. The reference servo bursts are read from the disk and used to maintain the head in a substantially spiral trajectory with respect to the disk to write a second set of product servo bursts to the disk.

The present invention may also be regarded as a disk drive comprising a disk having a plurality of data tracks, each data track comprising a plurality of data sectors and embedded servo sectors, each embedded servo sector comprising a plurality of product servo bursts written at a radial resolution finer than the radial resolution of the data tracks. The disk drive further comprises an actuator arm and a head attached to a distal end of the actuator arm, wherein the actuator arm is rotated to actuate the head radially over the disk to write data to and read data from the data sectors. The plurality of product servo bursts in a servo sector comprises a first set of product servo bursts and a second set of product servo bursts, wherein the second set of product servo bursts are written to the disk at an oblique angle relative to the first set of product servo bursts.

BRIEF DESCRIPTION OF THE DRAWINGS

FIG. 3A shows a magnified area of the disk format shown in FIG. 2B further illustrating how a first set of the product servo bursts are written to the disk while servoing circularly on the reference servo bursts and how a second set of the product servo bursts are written to the disk while servoing spirally on the reference servo bursts.

FIG. 3B shows that in the embodiment of FIG. 3A the second set of product servo bursts are written at an oblique angle relative to the first set of product servo bursts.

DESCRIPTION OF THE PREFERRED EMBODIMENTS

Figure 1:
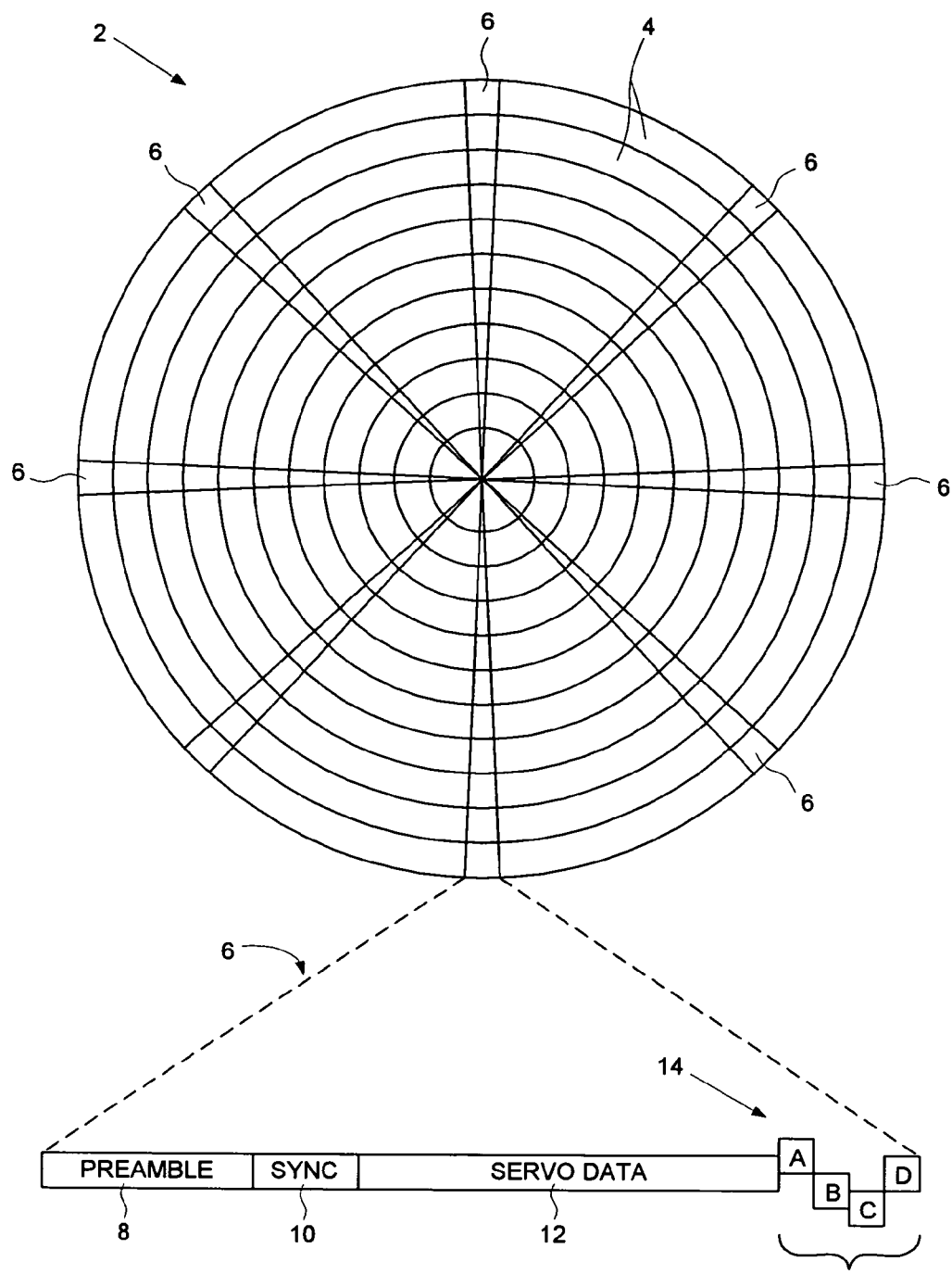
FIG. 1 shows a conventional disk format comprising a plurality of data tracks and embedded servo sectors.
Figures 2A, 2B:
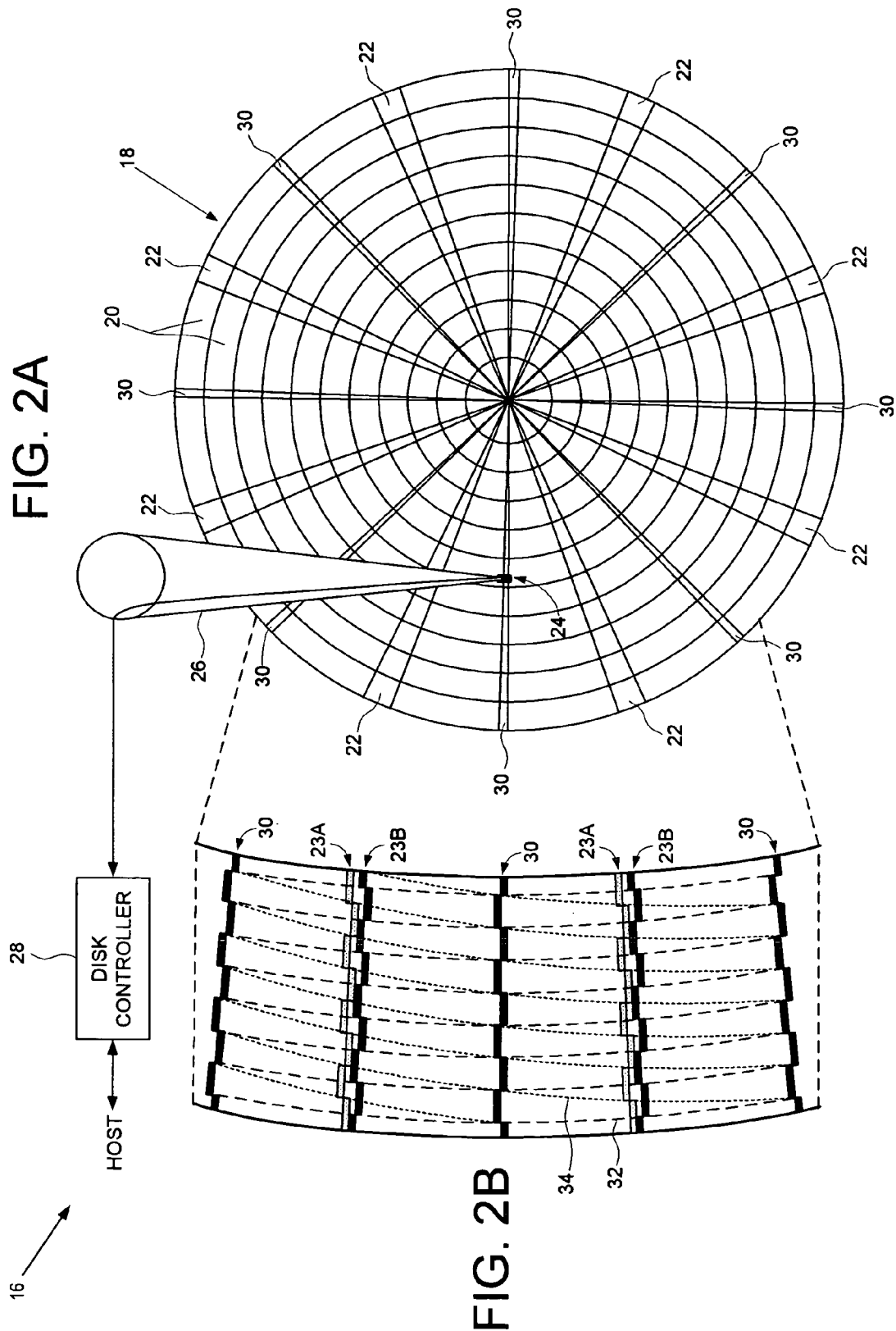
FIG. 2A shows a disk drive according to an embodiment of the present invention comprising a disk controller for performing a self servo writing operation by servoing circularly and spirally on prewritten reference servo bursts.
FIG. 2B shows a magnified area of the disk of FIG. 2A, including the prewritten reference servo bursts used to self servo write the product servo bursts while servoing circularly and spirally.

FIG. 2A show a disk drive 16 according to an embodiment of the present invention. The disk drive 16 comprises a disk 18 having a plurality of data tracks 20, each data track 20 comprising a plurality of data sectors and embedded servo sectors 22. FIG. 2B shows a magnified area of the disk 18 illustrating how each embedded servo sector 22 comprises a plurality of product servo bursts 23A and 23B written at a radial resolution finer than the radial resolution of the data tracks 20. A head 24 is attached to a distal end of an actuator arm 26, wherein the actuator arm 26 is rotated to actuate the head 24 radially over the disk 18 to write data to and read data from the data sectors. During a self servo writing operation, a disk controller 28 reads reference servo bursts 30 from the disk 18, wherein the reference servo bursts 30 are written to the disk 18 using an external servo writer at a radial resolution coarser than the radial resolution of the product servo bursts 23A and 23B. The disk controller 28 maintains the head 24 in a substantially circular trajectory 32 with respect to the disk 18 while writing a first set 23A of the product servo bursts to the disk 18. The disk controller 28 maintains the head 24 in a substantially spiral trajectory 34 with respect to the disk 18 while writing a second set 23B of the product servo bursts to the disk 18.

The disk controller 28 of FIG. 2A comprises suitable circuitry and/or software for processing the commands received from a host and for performing the self servo writing steps for writing the product servo bursts 23A and 23B to the disk 18. The disk controller 28 may comprise processor circuitry, interface circuitry, an error correction code (ECC), a read/write channel, servo control, etc. The disk controller 28 may be implemented as a plurality of distinct integrated circuits, or as a single integrated circuit.

FIG. 3A shows a magnified area of the disk format shown in FIG. 2B. In this embodiment, the reference servo bursts 30 are written to the disk 18 at a radial resolution equal to half the radial resolution of the product servo bursts 23A and 23B. As a result, the reference servo bursts 30 can be written by an external servo writer in essentially half the time required to write a full set of product servo bursts in the conventional manner. After writing the reference servo bursts 30 using the external servo writer, the disk drive 16 is sealed and the product servo bursts 23A and 23B are written during a self servo writing operation. Because the reference servo bursts 30 are written with an external servo writer, there is essentially no exponential error growth due to propagating the product servo bursts 23A and 23B as in the prior art self servo writing techniques.

In one embodiment, the reference servo bursts 30 are written with an external servo writer which "stamps" a pattern of servo bursts onto the disk 18 using a template pattern. Techniques for magnetic printing in which a template pattern is transferred to a magnetic disk (e.g., through heating) are known in the art and not disclosed here so as not to obscure the embodiments of the present invention.

In the embodiment of FIG. 3A, the product servo bursts 23A and 23B of an embedded servo sector 22 are disposed circumferentially between two reference servo bursts $30_0$ and $30_1$. That is, the disk controller 28 writes a single embedded servo sector 22, including the product servo bursts 23A and 23B, for each reference servo burst 30 processed. In an alternative embodiment, a plurality of servo bursts 23A and 23B corresponding to a plurality of embedded servo sectors 22 are disposed between two reference servo bursts $30_0$ and $30_1$ such that the disk controller 28 writes a plurality of embedded servo sectors 22 for each reference servo burst 30 processed.

When servoing on the prewritten reference servo bursts 30, the disk controller 28 maintains the head 24 along a circular or spiral trajectory so that the head 24 passes through the boundary of adjacent reference servo bursts. Referring again to FIG. 3A, when servoing circularly the head 24 passes through the boundary 36 between reference servo bursts 38 and 40, writes product servo burst 42, and then passes through the boundary 44 between reference servo bursts 46 and 48. After writing the product servo bursts 23A for the current data track, the head 24 is displace radially inward so as to circularly servo on the next data track. The head 24 passes through the boundary 50 between reference servo bursts 40 and 52, writes product servo burst 54, and then passes through the boundary 56 between reference servo bursts 48 and 58. This processes is repeated for each data track until the first set 23A of product servo bursts have been written to the disk 18.

When writing the second set 23B of product servo bursts, the disk controller 28 maintains the head 24 in a spiral trajectory so that it passes between the boundary of adjacent reference servo bursts. Referring again to FIG. 3A, when servoing spirally the head 24 passes through the boundary 36 between reference servo bursts 38 and 40, writes product servo burst 60, and then passes through the boundary 56 between reference servo bursts 48 and 58. The head 24 continues on the spiral trajectory from the outer to inner diameter tracks writing a product servo burst of the second set 23B for a single embedded servo sector 22 of each data track. The head 24 is then returned to the outer diameter track to again follow a spiral trajectory while writing another product servo burst of the second set 23B for each data track. For example, the head 24 passes through the boundary 50 of product servo bursts 40 and 52, writes product servo burst 62, and then passes through the boundary 64 between reference servo bursts 58 and 66.

Because the head 24 continues on a spiral trajectory while writing one of the product servo bursts of the second set 23B, the product servo bursts of the second set 23B are written at an oblique angle relative to the first set 23A of product servo bursts. This is illustrated in FIG. 3B which shows a magnified view of product servo burst 68 of the first set 23A and product servo burst 70 of the second set 23B. Product servo burst 70 is written at an oblique angle relative to product servo burst 68, thereby taking on the shape of a parallelogram as compared to the rectangular shape of product servo burst 68.

Figure 4:
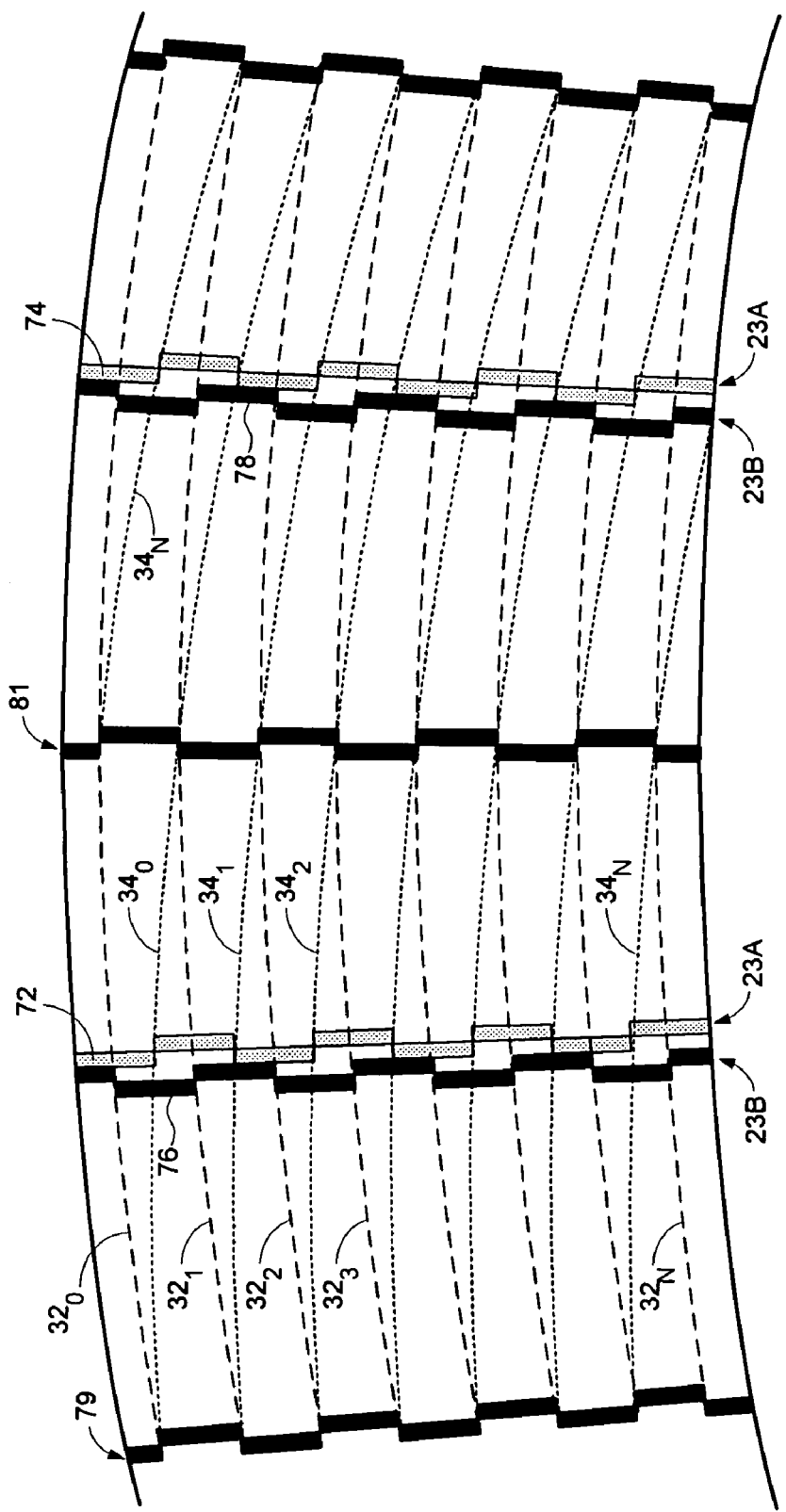
FIG. 4 shows a magnified view of the disk format shown in FIG. 2B, further illustrating the circular servo writing of the first set of product servo bursts and spiral servo writing of the second set of product servo bursts.

FIG. 4 shows a magnified view of the disk format of FIG. 2B further illustrating the circular trajectories $32_0$–$32_N$ followed while writing the first set 23A of product servo bursts, and the spiral trajectories $34_0$–$34_N$ followed while writing the second set 23B of product servo bursts. The first set 23A of product servo bursts are written over a single stroke of the actuator arm 26. In one embodiment, the head 24 is started at an outer diameter of the disk 18 and moved inward incrementally toward the inner diameter of the disk 18. Alternatively, the head 24 may start at an inner diameter of the disk 18 and move outward incrementally toward the outer diameter of the disk 18. During each revolution of the disk 18, the second set 23B of product servo bursts of every embedded servo sector 22 are written to the data track. In the illustration of FIG. 4, the product servo burst 72 is written, followed by product servo burst 74, and so on.

When writing the second set 23B of product servo bursts, only one embedded servo sector of a data track is written per revolution. Referring again to FIG. 4, while following spiral trajectory $34_0$ product servo burst 76 is written for a first data track, followed by product servo burst 78 for a next data track, and so on. This requires the second set 23B of product servo bursts to be written over multiple strokes of the actuator arm 26. Again, the head 24 may start at an outer diameter of the disk 18 and move inward, or start at an inner diameter of the disk 18 and move outward. Alternatively, the head 24 may spiral inward to an inner diameter track, then spiral outward to an outer diameter track, then spiral inward toward an inner diameter track, and so on. Each new spiral trajectory is started at a different circumferential location. Referring again to FIG. 4, spiral trajectory $34_0$ starts at reference servo burst 79, spiral trajectory $34_N$ starts at reference servo burst 81, and so on.

Figure 5A:
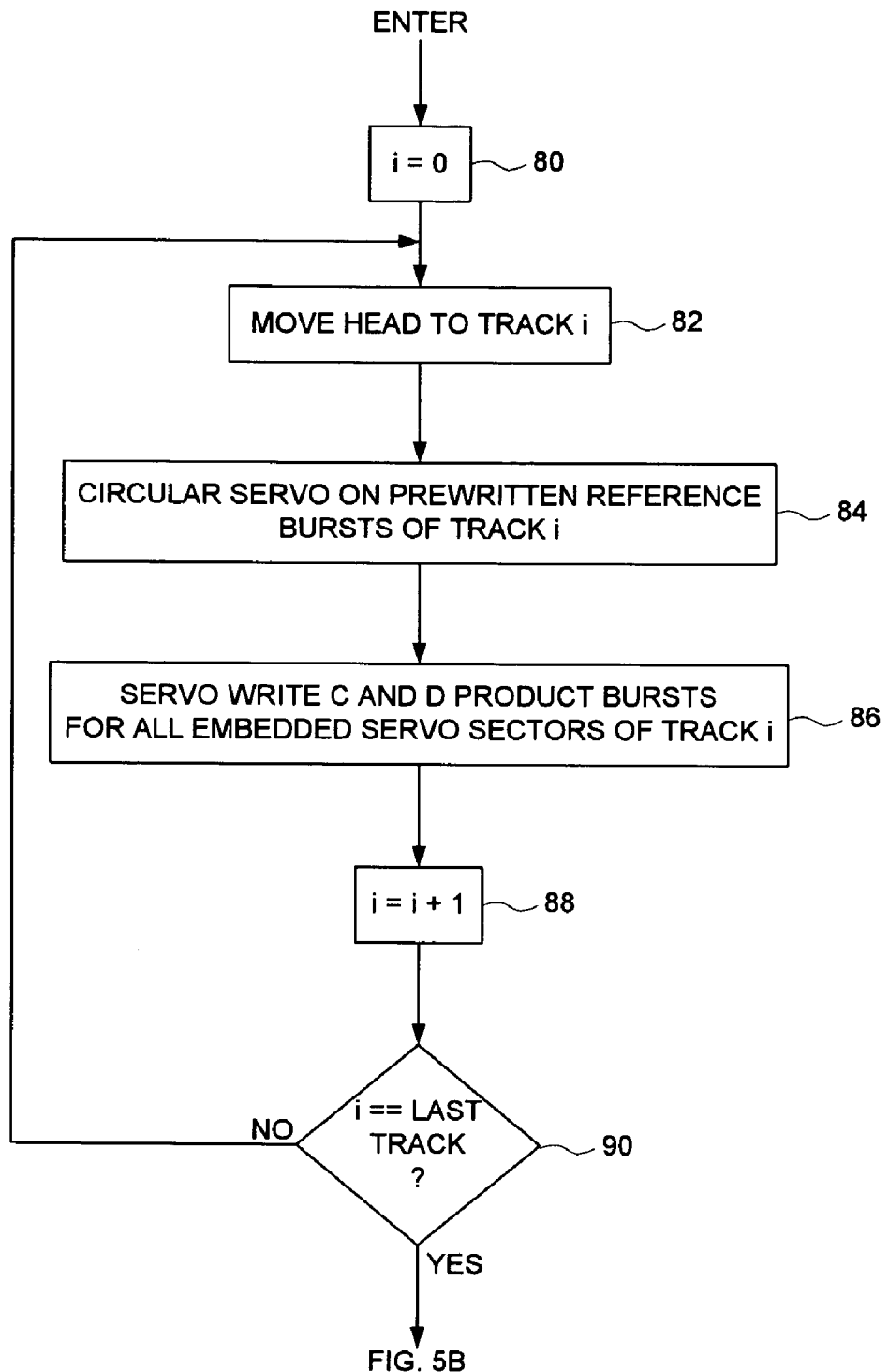
FIG. 5A is a flow diagram according to an embodiment of the present invention for writing the first set of product servo bursts over a single stroke of the actuator arm while servoing circularly on the prewritten reference servo bursts.

FIG. 5A shows a flow diagram according to an embodiment of the present invention for writing the first set 23A of product servo bursts over a single stroke of the actuator arm 26 while servoing circularly on the prewritten reference servo bursts 30. At step 80 a data track index i is set to zero to identify the starting data track (which may be an outer or inner diameter track). At step 82 the head 24 is positioned over data track i, and at step 84 the prewritten reference bursts 30 of data track i are processed in order to servo circularly. At step 86 the first set 23A of product servo bursts (e.g., servo bursts C and D) are written to all of the embedded servo sectors 22 of data track i. At step 88 the data track index i is incremented, and if at step 90 the last data track has not been servo written, the processes reiterates starting at step 82 wherein the head 24 is positioned over the next data track. If at step 90 the second set 23A of product servo bursts have been written to the last data track, then control passes to the flow diagram of FIG. 5B in order to write the second set 23B of product servo bursts while servoing spirally.

Figure 5B:
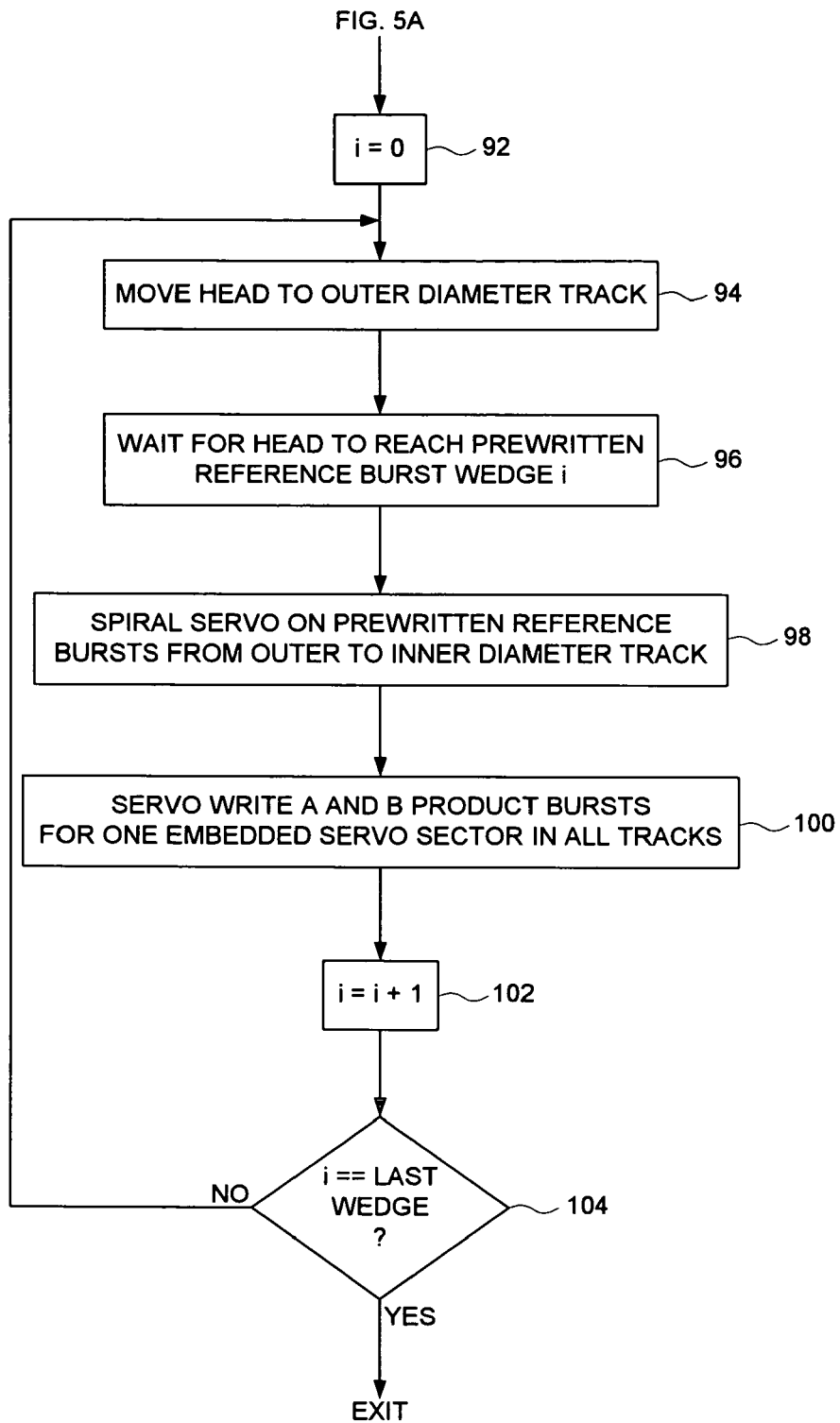
FIG. 5B is a flow diagram according to an embodiment of the present invention for writing the second of product servo bursts over multiple strokes of the actuator arm while servoing spirally on the prewritten reference servo bursts.

Referring to FIG. 5B, at step 92 a reference burst wedge index i is set to zero identifying the first set of reference servo bursts 30 to begin a spiral trajectory. At step 94 the head 24 is moved to an outer diameter track, and at step 96 the disk drive waits for the head 24 to reach the reference burst wedge i. At step 98 the disk drives begins the spiral trajectory toward the inner diameter of the disk 18, and at step 100 the second set 23B of product servo bursts (e.g., A and B) are written to one embedded servo sector 22 for each data track. At step 102 the reference burst wedge index i is incremented, and if at step 104 the last reference burst wedge has not been reached, the processed reiterates starting as step 94 by returning the head 24 to the outer diameter track to begin another spiral trajectory. If at step 104 the second set 23B of product servo bursts have been written over the last spiral trajectory starting from the last reference burst wedge, the self servo writing operation is complete and the process exits.

In one embodiment, the reference servo bursts 30 are only used to self servo write the product servo bursts 23A and 23B. Once the self servo writing operation is complete, the reference servo bursts 30 are either erased or overwritten with user data during normal operation of the disk drive. In an alternative embodiment, the reference servo bursts 30 are used to augment the product servo bursts 23A and 23B while tracking the centerline of a data track during normal operation of the disk drive.

In one embodiment, the external servo writer writes a periodic clock signal between the reference servo bursts 30 for each reference track. The clock signal is then processed by the disk controller 28 during the self servo writing operation in order to write the product servo bursts 23A and 23B at the appropriate circumferential location and so that the remaining fields of the embedded servo sectors 22 (e.g., the preamble, sync mark, track number, etc.) are properly aligned in the radial direction. In an alternative embodiment, the timing information for writing product servo bursts 23A and 23B as well as the remaining fields of the embedded servo sectors 22 is derived from the reference servo bursts 30.

The product servo bursts 23A and 23B in the embedded servo sectors 22 may be written using any suitable pattern and any suitable radial resolution with respect to the data tracks. Similarly, the reference servo bursts 30 may be written using any suitable pattern and any suitable radial resolution with respect to the data tracks.

Any suitable head 24 may be employed in the embodiments of the present invention, including a conventional inductive type head employing a coil for both writing and reading, as well as the newer magnetoresistive (MR) type head employing a coil for writing and an MR element for reading. With MR heads, the write element (coil) is typically displaced radially from the MR read element. Referring again to FIG. 3A, the offset between the read and write elements will cause a corresponding offset between the reference servo bursts 30 and the product servo bursts 23A and 23B. That is, the product servo bursts 23A and 23B, as well as the data tracks 4 defined by the product servo bursts 23A and 23B, are shifted slightly in the radial direction. This slight offset does not affect the normal operation of the disk drive, and there is no need to calibrate the self servo writing operation to account for the offset between the read and write elements.

I claim:

1. A disk drive comprising:
   (a) a disk comprising a plurality of data tracks, each data track comprising a plurality of data sectors and embedded servo sectors, each embedded servo sector comprising a plurality of product servo bursts written at a radial resolution finer than the radial resolution of the data tracks;
   (b) an actuator arm;
   (c) a head attached to a distal end of the actuator arm, wherein the actuator arm is rotated to actuate the head radially over the disk to write data to and read data from the data sectors; and
   (d) a disk controller for servoing the head during read and write operations in response to the product servo bursts in the embedded servo sectors, and for self servo writing the disk by:
      reading reference servo bursts from the disk, wherein the reference servo bursts are written to the disk using an external servo writer at a radial resolution coarser than the radial resolution of the product servo bursts;
      processing the reference servo bursts to maintain the head in a substantially circular trajectory with respect to the disk to write a first set of the product servo bursts to the disk; and
      processing the reference servo bursts to maintain the head in a substantially spiral trajectory with respect to the disk to write a second set of the product servo bursts to the disk.

2. The disk drive as recited in claim 1, wherein the reference servo bursts are written to the disk at a radial resolution equal to half the radial resolution of the product servo bursts.

3. The disk drive as recited in claim 1, wherein a single product servo burst is written circumferentially to the disk between two reference servo bursts.

4. The disk drive as recited in claim 1, wherein a plurality of product servo bursts are written circumferentially to the disk between two reference servo bursts.

5. The disk drive as recited in claim 1, wherein the second set of product servo bursts are written to the disk at an oblique angle relative to the first set of product servo bursts.

6. The disk drive as recited in claim 1, wherein the disk controller writes the first set of product servo bursts to the disk over a single stroke of the actuator arm.

7. The disk drive as recited in claim 1, wherein the disk controller writes the second set of product servo bursts to the disk over multiple strokes of the actuator arm.

8. The disk drive as recited in claim 1, wherein the disk controller erases the reference servo bursts.

9. The disk drive as recited in claim 1, wherein the disk controller overwrites the reference servo bursts with user data.

10. A method of servo writing a disk drive with product servo bursts used for servoing a head during read and write operations, the disk drive comprising a disk, an actuator arm, and the head attached to a distal end of the actuator arm, the method comprising the steps of:
    (a) using an external servo writer to write a plurality of reference servo bursts to the disk;
    (b) reading the reference servo bursts from the disk and maintaining the head in a substantially circular trajectory with respect to the disk to write a first set of the product servo bursts to the disk; and
    (c) reading the reference servo bursts from the disk and maintaining the head in a substantially spiral trajectory with respect to the disk to write a second set of the product servo bursts to the disk.

11. The method as recited in claim 10, wherein the reference servo bursts are written to the disk at a radial resolution equal to half the radial resolution of the product servo bursts.

12. The method as recited in claim 10, wherein a single product servo burst is written circumferentially to the disk between two reference servo bursts.

13. The method as recited in claim 10, wherein a plurality of product servo bursts are written circumferentially to the disk between two reference servo bursts.

14. The method as recited in claim 10, wherein the second set of product servo bursts are written to the disk at an oblique angle relative to the first set of product servo bursts.

15. The method as recited in claim 10, wherein the first set of product servo bursts are written to the disk over a single stroke of the actuator arm.

16. The method as recited in claim 10, wherein the second set of product servo bursts are written to the disk over multiple strokes of the actuator arm.

17. The method as recited in claim 10, further comprising the step of erasing the reference servo bursts.

18. The method as recited in claim 10, further comprising the step of overwriting the reference servo bursts with user data.

19. A disk drive comprising:
    (a) a disk comprising a plurality of data tracks, each data track comprising a plurality of data sectors and embedded servo sectors, each embedded servo sector comprising a plurality of product servo bursts written at a radial resolution finer than the radial resolution of the data tracks;
    (b) an actuator arm; and
    (c) a head attached to a distal end of the actuator arm, wherein the actuator arm is rotated to actuate the head radially over the disk to write data to and read data from the data sectors;
    wherein:
       the plurality of product servo bursts in a servo sector comprises a first set of product servo bursts and a second set of product servo bursts; and
       the second set of product servo bursts are written to the disk at an oblique angle relative to the first set of product servo bursts.

20. The disk drive as recited in claim 19, wherein:
    (a) the first set of product servo bursts are written to the disk while tracking reference servo bursts in a substantially circular trajectory; and
    (b) the second set of product servo bursts are written to the disk while tracking reference servo bursts in a substantially spiral trajectory.

* * * * *